(12) United States Patent
Lobb

(10) Patent No.: US 6,288,781 B1
(45) Date of Patent: Sep. 11, 2001

(54) IMAGING SPECTROMETER

(75) Inventor: Daniel Richard Lobb, Chislehurst Kent (GB)

(73) Assignee: Sira Electro-Optics Ltd, Chislehurst (GB)

(*) Notice: Subject to any disclaimer, the term of this patent is extended or adjusted under 35 U.S.C. 154(b) by 0 days.

(21) Appl. No.: 09/380,001

(22) PCT Filed: Feb. 24, 1998

(86) PCT No.: PCT/GB98/00595

§ 371 Date: Nov. 27, 1999

§ 102(e) Date: Nov. 27, 1999

(87) PCT Pub. No.: WO98/37389

PCT Pub. Date: Aug. 27, 1998

(30) Foreign Application Priority Data

Feb. 24, 1997 (GB) .................................... 9703770

(51) Int. Cl.[7] ........................................ G01J 3/28
(52) U.S. Cl. ........................................... 356/326
(58) Field of Search ....................... 356/326, 328

(56) References Cited

U.S. PATENT DOCUMENTS 4,743,112 * 5/1988 Burke .................................. 356/326
5,781,290 * 7/1998 Bittner et al. ..................... 356/326

* cited by examiner

Primary Examiner—F. L. Evans
(74) Attorney, Agent, or Firm—Fliesler Dubb Meyer & Lovejoy LLP

(57) ABSTRACT

An imaging spectrometer to form a spectrally resolved image of an object, the spectrometer comprising three curved reflecting surfaces, an optical path between the object and the image comprising reflections from the three curved reflecting surfaces. The spectrometer further comprises dispersing elements each with a curved surface in the optical path. One dispersing element is located in the optical path between the object and a first of the curved reflecting surfaces; another dispersing element is located in the optical path between the image and a third of the curved reflecting surfaces. The majority of the spectrometer's dispersive power may be provided by optical elements in the optical paths between the object and the first of the curved reflecting surfaces and between the image and the third of the curved reflecting surfaces.

14 Claims, 14 Drawing Sheets

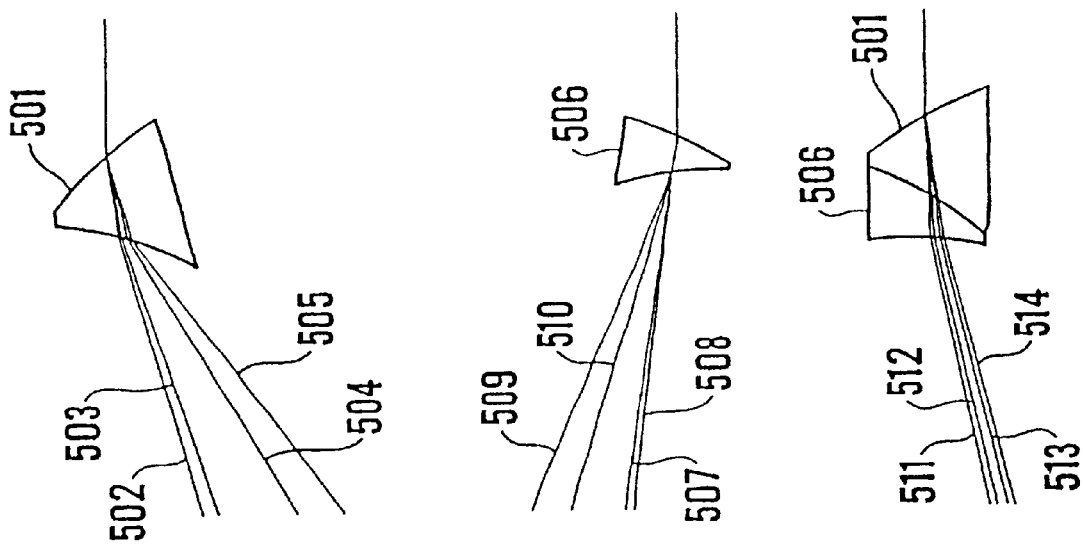

IMAGING SPECTROMETER

The invention relates to design and construction of prism spectrometers, and more particularly to imaging spectrometers.

Spectrometers are instruments used to measure the spectral content of light and other electromagnetic radiation. The spectral data is used to provide information on the sources of the radiation. There are many types of spectrometer, using different methods to distinguish the spectral components of radiation. In this invention, we are concerned particularly with the classical method in which the radiation is dispersed by a refracting element, usually called a prism.

A typical prism spectrometer is shown schematically in FIG. 1. In this diagram, radiation from the source 100 is thrown onto an entrance slit 101. The radiation passing through the slit, represented by the lines 102 and 103, is then collimated by a collimator 104, passed through a refracting prism 105, and re-imaged by a re-imager 106 onto a detection system 107. The collimator 104 and re-imager 106 may be lenses as indicated schematically in FIG. 1, or they may include curved mirrors. The prism produces different deflections of the radiation, according to wavelength, in the section orthogonal to the slit. The slit is therefore re-imaged as a spectrum.

The spectral content of the radiation can be read by using a detection system in the form of an array of detector elements, 107, as indicated in FIG. 1. Alternatively, the spectral content can be measured by using a single detector element, if the configuration includes some scanning capability to move the spectrum image with respect to the detector. We will, however, describe spectrometers in which a fixed optical system is used with a fixed detector array to provide simultaneous measurement of a complete spectral range.

An imaging spectrometer system is shown schematically in FIG. 2. In this diagram, a radiation source 200 is imaged by a source-imager 201 onto a slit 202. The beam is again collimated by a collimator 203, dispersed by a refracting prism 204, and re-imaged by a re-imager 205 onto a detection system 206. However, in this case, care is taken to form a well-resolved image of the source onto the slit, and the collimator and re-imaging optics are designed to form a well-resolved image of the slit, in each component wavelength, onto the detection system. The detection system becomes an area-array of elements 207, in which each point in the source image is reimaged as a line spectrum onto a detector-array column 208, and each detector-array row 209 is associated with a different resolved waveband of radiation. When the detector array signals are read-out, they provide data on the spectral content of all spatially-resolved source points that are imaged onto the slit and re-imaged onto the detector array. The system thus provides simultaneous spectral information on a line of spatially-resolved points in the source area. Typically, this line is then scanned, by relative movement of the source and the spectrometer, to build a detailed data-base on the spectral content of an area of the source.

Imaging spectrometers are used to record the spectral content of source areas that show significant spatial variations of spectral radiance. For example, an imaging spectrometer may be used to make a detailed record of the colours of all points in a picture. An important application at present is in Earth observation. Imaging spectrometers are mounted on aircraft and flown on Earth-orbiting, satellites, to measure the spectral content of selected scenes on Earth surface. This data has a wide range of present and possible applications, for example:—vegetation can be identified, and its health analysed, from the spectral content of the image, minerals can be identified for possible mining exploitation, pollution of water can be assessed in open oceans, coastal zones and inland water areas.

Prism spectrometers give relatively low spectral resolution—with resolved wavebands typically in the range from 1 nm to some tens of nanometers, in the visible and near infrared spectral regions. This spectral resolution is not adequate for many scientific applications, for which different types of spectrometer are used. However, it is adequate for many applications, including general colour measurement, and for Earth observation. Prism spectrometers are often preferred in these applications because prisms allow wide spectral ranges to be covered efficiently and simply in a single instrument. For example, a prism spectrometer can be designed to cover the whole spectral range from 400 nm to 2500 nm. This range is of particular interest for Earth-observation from aircraft and satellites.

Designs for prism spectrometers in which lenses are used both for collimation and re-imaging, are indicated in FIG. 2. All-mirror systems can also be used for collimation and re-imaging, as shown for example in FIG. 3. In FIGS. 2 and 3, like features are indicated by like numerals. The collimator becomes a system of two mirrors, 301 and 302. The re-imager is a system of two mirrors, 303 and 304. Catadioptric systems (using a combination of mirrors and refracting elements) are also known. Performance of an imaging spectrometer is limited by the image quality provided by the collimators and re-imagers. Spatial resolution is limited by the resolution provided along the slit image in each wavelength, and spectral resolution is limited by the resolution of the optics across the slit image at each wavelength. Interpretation of the spectral data can also be complicated by distortion of the slit images in each wavelength, if the distortion produces non-straight images of the entrance slit on the straight rows of the detector array.

Imaging spectrometers that use only refracting lenses, as indicated in FIG. 2, are limited in performance particularly by the axial chromatic aberrations of the lenses. Axial chromatic aberration produces differences of focus, as a function of wavelength, which prevent good resolution at all the wavelengths in the spectrometer range, unless the range is restricted. It is possible to achieve correction for chromatic aberration over increased wavelength ranges by use of two or more refracting materials, so that good resolution is often achievable, for example, over the complete visible range. However, correction over much wider spectral ranges, that are often required in imaging spectrometers, becomes difficult or impossible without excessive optical complexity.

All-mirror systems are often favoured for spectrometers covering very wide spectral ranges, because they have no chromatic aberrations. Very simple mirror systems are used in spectrometers with single-point or linear array detection systems. However, more complex mirror systems are needed to give adequate resolution in imaging spectrometers using area-array detectors. It is possible to design a collimator that is well-corrected for all optical aberrations, using two mirrors, as indicated in FIG. 3, in which the mirror 301 following the slit is concave, and the mirror preceding the prism 302 is convex. A similar two mirror design can be used for the imager, as indicated in FIG. 3. However, in this design form, all the curved mirrors must have aspherical surfaces so that the components tend to be expensive and difficult to align. The two-mirror system also tends to be large, since the separation of the two mirrors is approximately double the focal length of the combination.

More compact two-mirror systems can be well-corrected only for small field angles, making them less suitable for imaging spectrometers, and they also in general require at least one aspherical component. Three-mirror systems can be relatively compact and also well-corrected for use in imaging spectrometers, but they generally require at least two aspherical components. Systems of four or more mirrors can use only spherical mirrors, but they tend to be large, and the increased system complexity is undesirable.

U.S. Pat. No. 5,127,728 Warren uses "aplanatic" curved refracting elements to control aberrations but the aplanatic condition tends to produce relatively large higher order aberrations.

Catadioptric systems are often favoured in imagine spectrometers, because they can generally be compact and use only spherical optical surfaces. However, a typical catadioptric collimator or imager will include two curved mirrors and three refracting elements, so that the system is relatively complex.

Complexity is undesirable in imaging spectrometers partly because of the effects of scatter at all optical surfaces, and of stray reflections at refracting surfaces. Some of the scattered and stray reflected radiation arrives at the detector and introduces errors in the recorded spectra. The stray radiation is normally called "stray light", although it includes all radiation to which the detectors are sensitive. To limit stray light, it is in general desirable to limit the total number of surfaces that can contribute scatter. Refracting surfaces must be controlled carefully to prevent stray reflections directly to the detector, and aspherical optical surfaces are preferably avoided, since it is difficult in manufacture to control both the aspherical shape and the fine surface structure that produce scatter.

It is therefore desirable for an imaging spectrometer to form well resolved images over detector arrays extended in two dimensions. Preferably such a spectrometer should have few optical surfaces and include no aspherical optical surfaces. A wide spectral range is also useful.

According to one aspect of the present invention there is provided an imaging spectrometer to form a spectrally resolved image of an object slit, light travelling from the object slit to the image along an optical path, the spectrometer comprising first, second and third curved reflecting surfaces. The spectrometer is characterised by at least two dispersing elements, each with at least one curved surface; the spectrometer being, configured such that the optical path leads from the object slit, through the curved surface of one of the dispersing elements to the first curved reflecting surface; from the first curved reflecting surface to the second curved reflecting surface; from the second curved reflecting surface, to the third curved reflecting surface, and from the third curved reflecting surface, through the curved surface of another of the dispersing elements, to the image.

The majority of the spectrometer's dispersive power may be provided by dispersing elements in the optical paths between the object and the first of the curved reflecting surfaces and between the image and the third of the curved reflecting surfaces. The dispersing elements may be prisms and the curved reflecting surfaces may comprise a convex and concave mirror surface; the first and third curved reflecting surfaces may comprise a single physical mirror surface. Further optical elements may be included to control image aberrations. The curved surfaces of the dispersing elements and/or of the curved reflecting surfaces may be substantially spherical. Between wavelengths of 200 nm and 3500 nm the dispersing elements may be such that they produce dispersion mainly in the same direction.

According to a second aspect of the invention there is provided an imaging spectrometer to form a spectrally resolved image of an object slit, light travelling from the object slit to the image along an optical path, the spectrometer comprising a curved reflecting surface, and a dispersing element with a curved surface. The spectrometer is characterised by the spectrometer further comprising first and second curved refracting surfaces; the spectrometer being configured such of the the optical path leads from the object slit, through the first curved refracting surface and through the curved surface of the dispersing element to the curved reflecting surface; and from the curved reflecting surface, through the curved surface of the dispersing element and through the second curved refracting surface to the image.

The two curved reflecting surfaces may comprise a single physical surface and the curved reflecting surface and the curved retracting surfaces may be substantially, spherical. The single physical surface may be the surface of a refracting element another surface of which is planar and has the object located on it.

The spectrometer of either aspect of the invention may further comprise an electronic detector with a plurality of detecting elements providing output signals, the detector being located at the image position to detect the image; and summing means to sum the output signals from at least two detecting elements located in a region of relative high spectral resolution. Such an arrangement can help in compensating for non-uniform spectral resolution which may be exhibited by the dispersing elements.

In order to promote a fuller understanding of the above and other aspects of the invention, some embodiments will now be described, by way of example only, with reference to the accompanying drawings in which:

FIGS. 5A and 5B show respectively curved refracting wedges and an area array detector.

There is a class of simple relay imaging system, that provides very good correction at unit magnification. These systems are called concentric, since all curved surfaces have centres of curvature at approximately or exactly the same point. There are several different kinds of concentric relay system. Two examples are shown in FIGS. 4A and 4B.

Figure 4A:
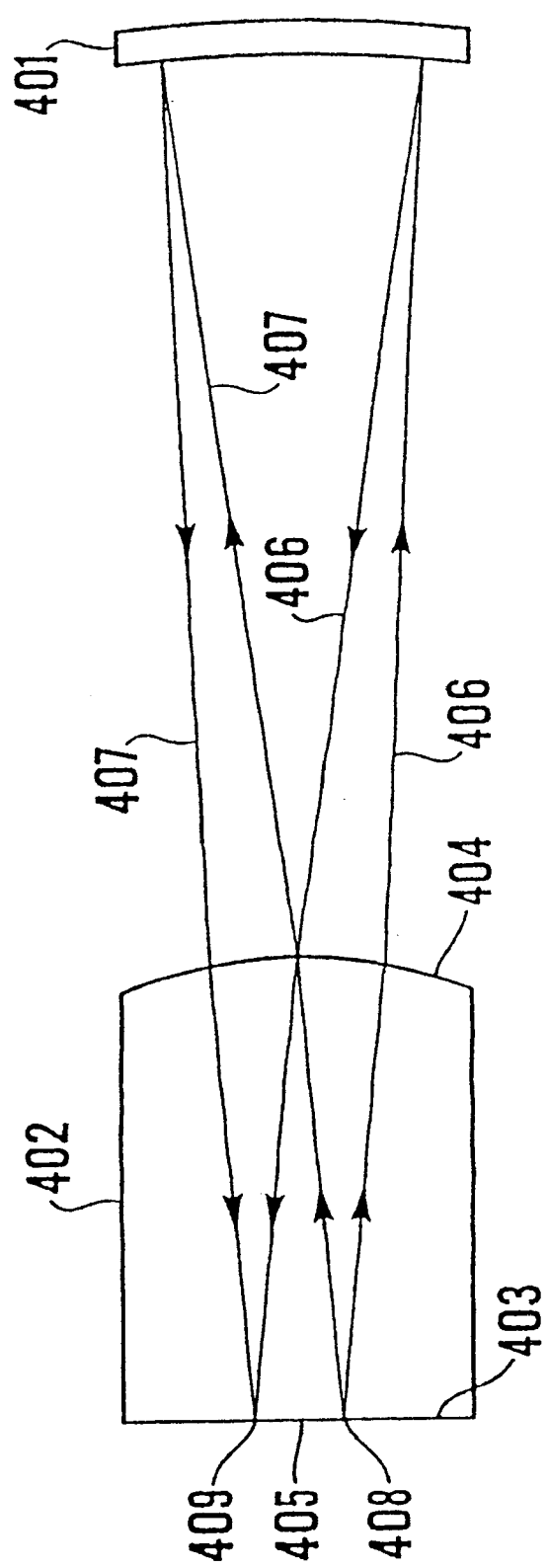
FIGS. 4A and 4B show respectively a Dyson relay and an Offner relay.

FIG. 4A shows a relay system originally designed by Dyson, which includes a concave spherical mirror 401, and a thick lens element 402. The lens element has a flat surface 403, and a spherical surface 404. The centres of curvature of the refracting surface 404 and the mirror surface are nominally at a common point 405 on the flat surface 403. The mirror 401 is located approximately at the focal plane of the refracting element 402. The object surface and the image surface are both at the flat surface 403. Rays 406, 407 are shown departing from a point 408 in surface 403, refracted through the spherical surface 404 of the lens, reflected from the mirror 401, again refracted through the spherical surface 404 of the lens, and focusing at the point 409 in surface 403.

Figure 4B:
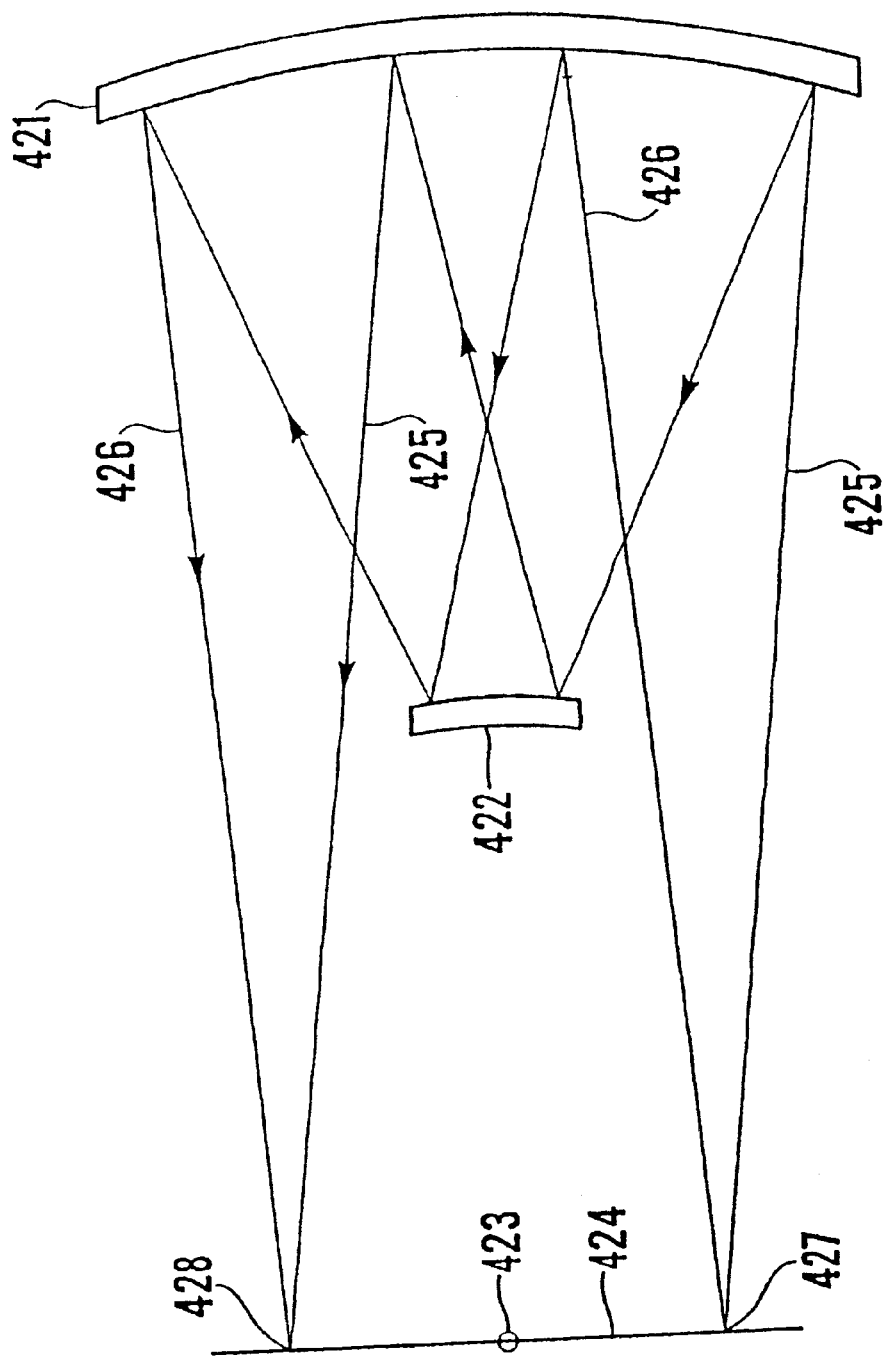

FIG. 4B shows a relay system originally designed by Offner, which includes a concave spherical mirror 421 and a convex spherical mirror 422. The two mirrors have centres of curvature nominally at the same point 423. The radius of curvature of the convex mirror 422 is approximately half of the radius of curvature of the concave mirror 421. The object and image planes for this system may be any plane 424 that includes the point 423. Rays 425 and 426 are shown diverging from an object point 427 in the plane 424, reflected from the concave mirror 421, then from the convex mirror 422, again from the concave mirror 421, and finally converging to focus on the point 428 in the plane 424.

The concentric optical relay designs, illustrated by examples in FIGS. 4A and 4B, have some of the basic features that are very desirable in imaging spectrometers.

Figure 6:
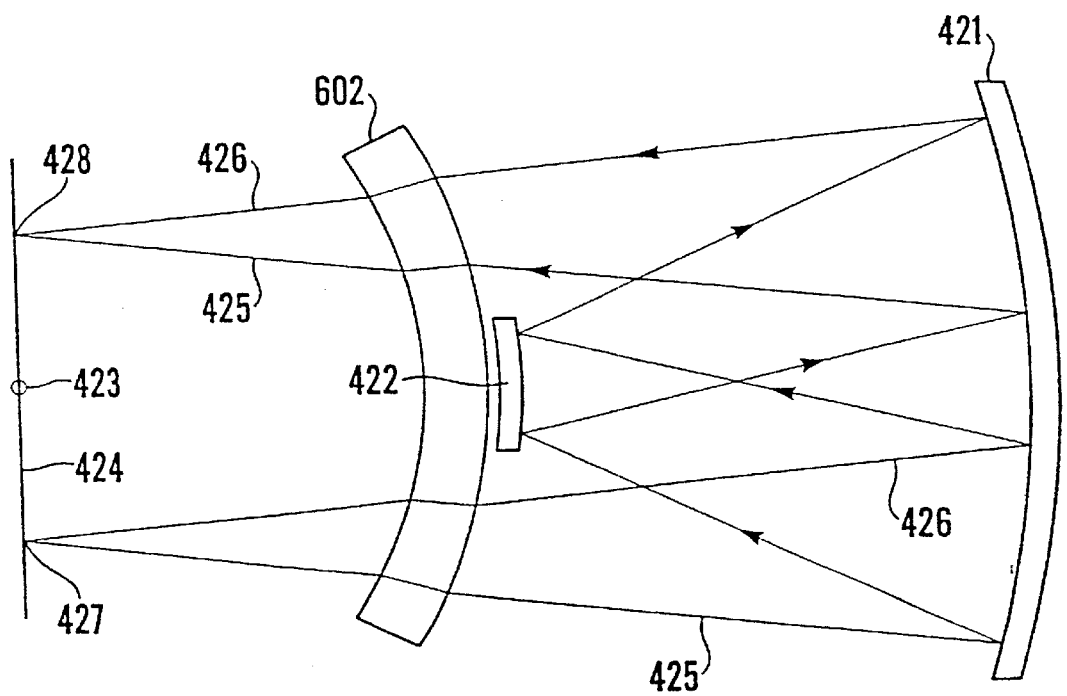
FIG. 6 shows corrected Dyson and Offner relay systems.
Figure 6:
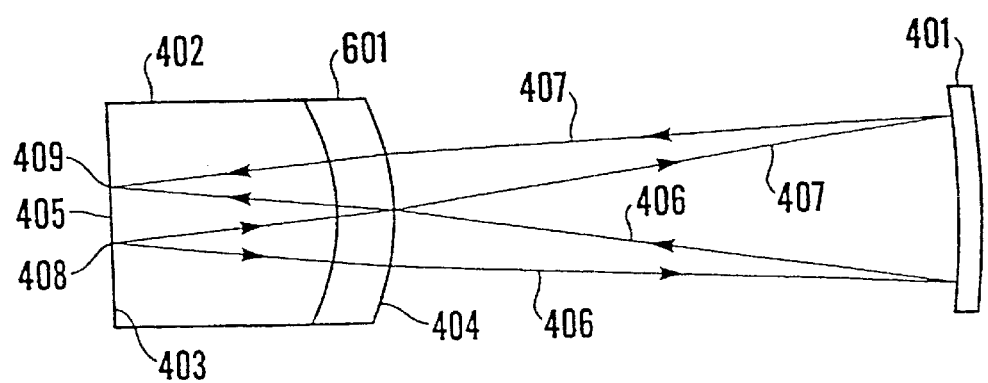

They relay the radiation from a source plane, at which a slit may be located, to an image plane at which a detector array may be located, they include no surfaces that are not nominally spherical or flat, and they have minimal numbers of optical surfaces. They can be extremely well corrected in the simple forms shown in FIGS. 4A and 4B. Correction can be further improved by adding more near-concentric elements as indicated in FIG. 6. This diagram shows both the Dyson and Offner systems, with components numbered as in FIGS. 4A and 4B. The Dyson relay is improved by adding a near-concentric meniscus element 601, of high refractive index, to the refracting element 402. The Offner relay is improved by adding a refracting, near-concentric meniscus element 602

Figure 1:
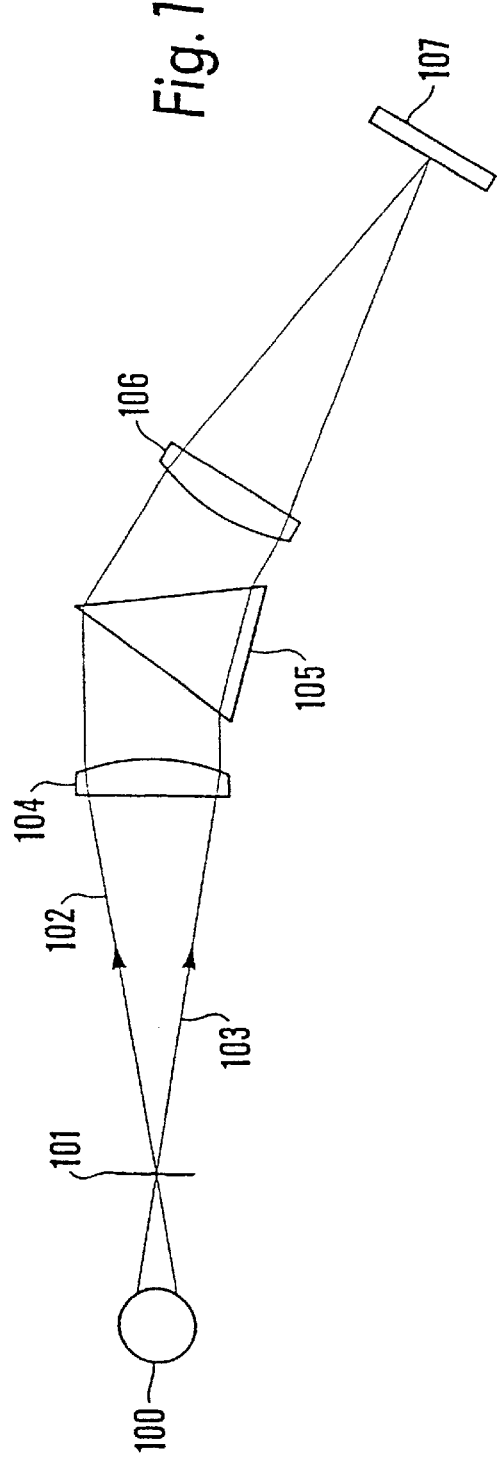
FIG. 1 shows a typical prism spectrometer.
Figure 2:
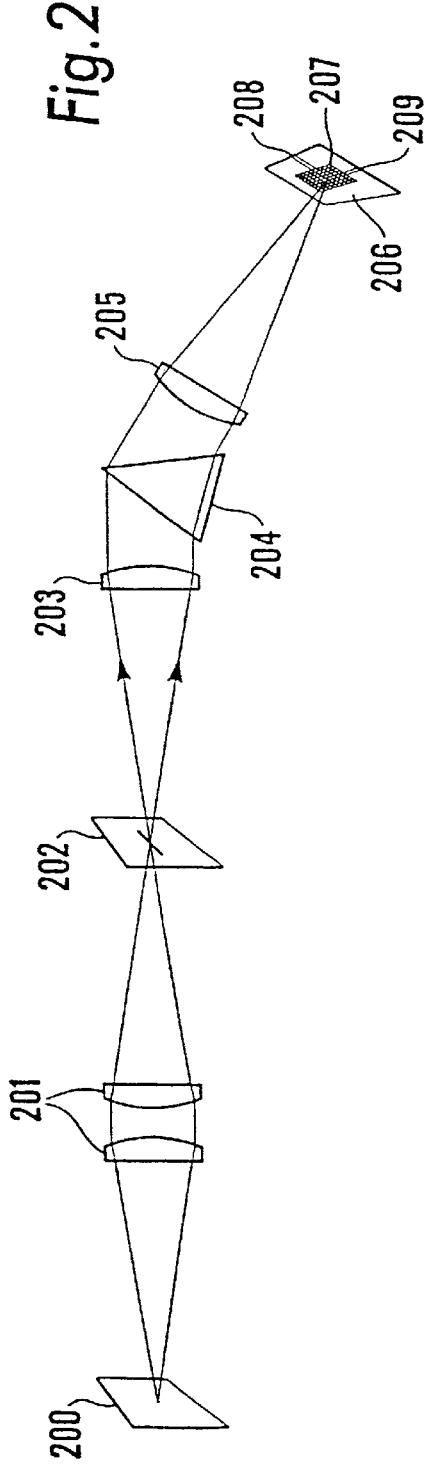
FIG. 2 shows an imaging spectrometer.
Figure 3:
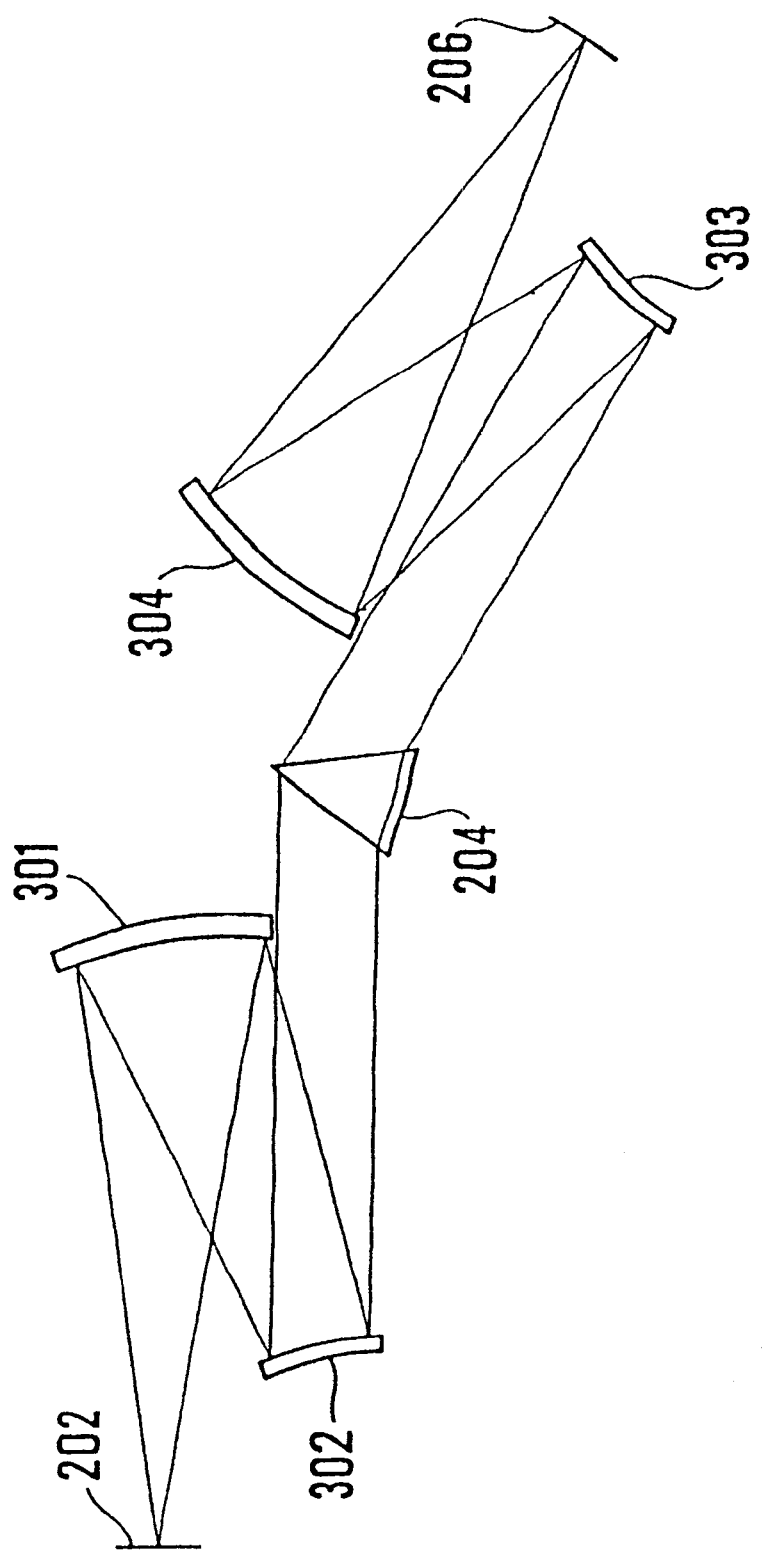
FIG. 3 shows an imaging spectrometer with mirror collimators.

However, concentric relay systems of the kinds shown in FIGS. 4A, 4B and 6 have not been used in spectrometers, because they do not, at any part of the radiation path, produce collimated light—in all sections of the light path, the rays from a single object point are either diverging or converging. When converging or diverging radiation passes through a flat refracting surface, at a non-zero mean angle of incidence, the transmission produces three principal optical aberrations:—spherical aberration, coma and astigmatism. These aberrations in general blur the final image, which degrades the spectral resolution of spectrometers, and the spatial resolution of imaging spectrometers. Prisms are therefore normally located in collimated (neither converging nor diverging) radiation paths, as indicated in FIGS. 1, 2 and 3. Arrangements of this kind have been preferred, since flat surfaces in collimated radiation give no optical aberrations (except for the separation of the image into wavelength components that is a basic function of a spectrometer).

It is possible to correct some of the aberrations, produced by passing non-collimated light through flat prism surfaces, by selecting the mean angles of incidence on successive surfaces. Using only one prism, it is possible to produce a primary correction for astigmatism. Spherical aberration is normally less significant—it may be tolerated, but it can also in principal be corrected by modification in the curved optics used to collimate and reimage.

Figure 7:
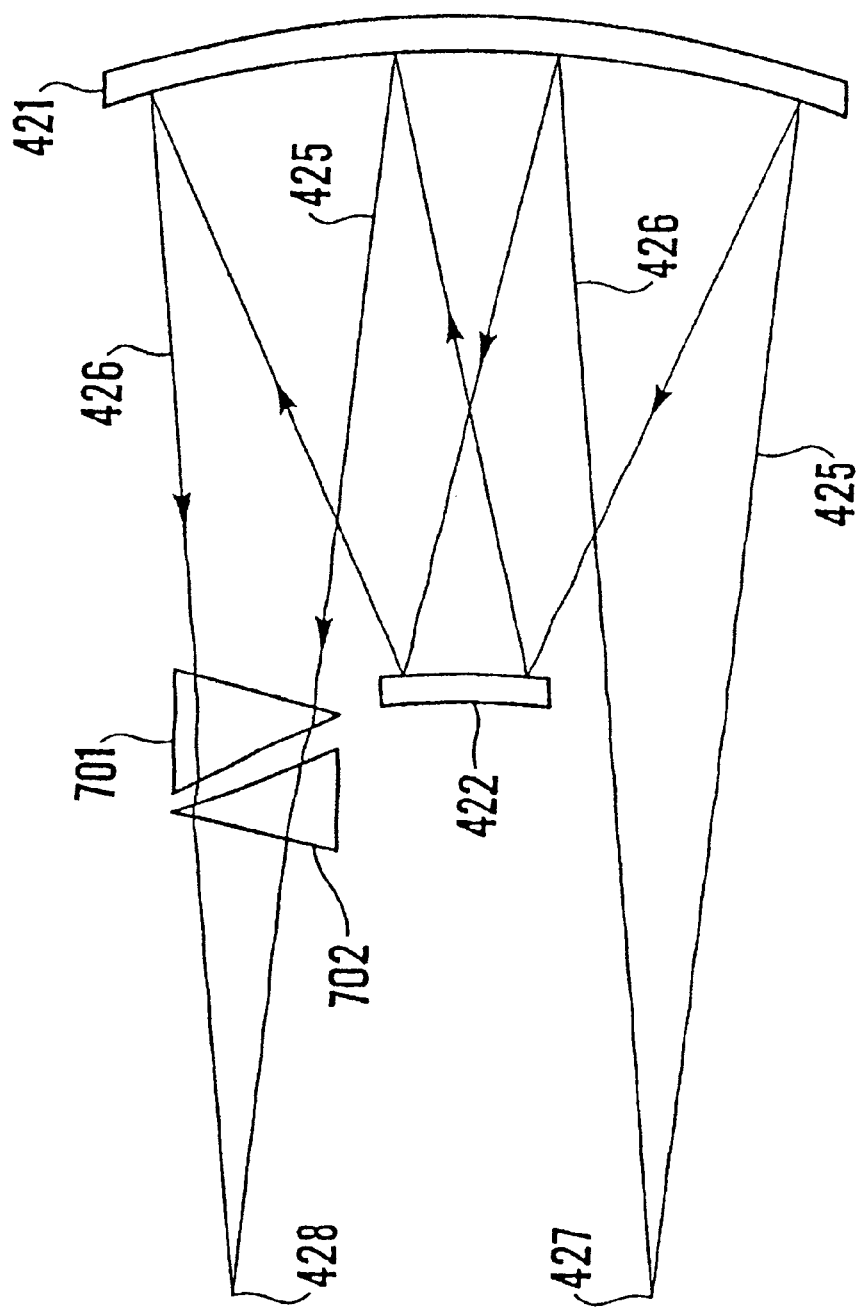
FIG. 7 shows an optical system with two prisms with opposite deflections.

However, correction for coma presents more significant problems. For each prism material, there is a first-order relationship between coma and deflection of the radiation, at each optical surface. Correction for coma therefore requires a minimum of two prisms deflecting the radiation in opposite directions, as indicated in FIG. 7. In FIG. 7, an Offner relay is shown, with components indicated by the same numerals as those used in FIG. 5. The two prisms are indicated by numerals 701 and 702. Since the two prisms deflect light in opposite directions, they must produce spectral dispersion in opposite directions, reducing the total spectral resolution provided by the system. Net spectral resolution can be produced only by using different materials for the two prisms, the two materials having a substantial difference of dispersive power.

For the visible region, suitable pairs of materials are available; for example the prisms 701 and 702 may be made respectively of fluorite and a flint optical glass. However, it is difficult to find materials that a have a useful difference of dispersion over very wide spectral ranges. Thus for example fluorite and flint optical glasses have a large difference of dispersion in the visible region, but they have similar dispersions in the short-wave infra-red spectral region, between wavelengths 1 micron and 2.5 microns. Spectral resolution can be improved by using more prisms, with the disadvantages of added complexity, but the practical spectral range of the design tends to be limited to wavelengths below about 1 micron.

Even with this complexity, however, it is not possible to provide an ideal correction for aberrations. Because the coma produced by each prism is related to the deflection of the prisms, it is possible to correct coma exactly only for one total deflection produced by both prisms. The function of the spectrometer requires different deflections for different wavelengths, so that coma can be corrected for only one wavelength; the aberration increases for wavelengths according to their linear separation from the nominally-correct wavelength in the final image. In effect, therefore, coma correction imposes a limit on the spectral spread of the image, which limits either spectral resolution, spectral range or both. The significance of this limitation depends on the relative aperture of the relay optics, since primary comatic aberration varies with the square of the relative aperture.

In a spectrometer using refractive dispersion the refracting elements deflect the transmitted radiation to separate wavelengths in the final image, and the radiation may therefore be arranged to fall on at least one refracting surface at a substantial mean angle of incidence. Since the refracting surfaces need not be flat, curved wedges may be considered as an alternative to convention al prisms. A sufficient condition for correction of two primary aberrations—spherical aberration and coma—at any optical surface, is that all rays in the set from each object point have equal angles of incidence on the surface. It may therefore not be necessary to use materials of different dispersive properties deflecting the radiation in opposite direction, in order to correct coma. If two or more wedges are used, they may be of the same material, and all or most surfaces of wedges may produce complementary dispersions. This means that angles of incidence on prism surfaces can generally be lower, since the deflection requirements are shared. The surfaces of curved refracting wedges can therefore usefully be curved such that the angles of incidence are near constant over the surface, although, in general an optimised optical system will not exhibit this property. The astigmatism produced by the entry surface of a curved wedge is always of opposite sign to the astigmatism produced by the exit face of the same wedge, so that the contributions of the surfaces can be made to compensate. In practice, it will often be desirable to include more than one curved wedge in a design, and/or a double-pass of the beam through one or more wedges, to increase the total dispersion that can be achieved by the system, and to permit better correction of optical aberrations.

The configuration described herein allows all curved refracting wedges to be made of a common material, if desired. Using a single refracting material, it is possible to design a spectrometer covering a very wide spectral range, since the refractive index of any one material varies monotonically with wavelength over its transmission band. For example, fused quartz could in principle be used over its complete transmission band, to cover the wavelength range from 200 nm to 3.5 microns. Since the refracting components providing the major deflections produce complementary dispersion, relatively low angles of incidence on individual surfaces can be used. This allows better control of higher-order optical aberrations, and also limits the polarisation produced by oblique incidence. In practice, these advantages may be used to allow more compact spectrometers to be designed. Compactness, with relative simplicity, is an important attribute, particularly for optics used on spacecraft.

Dispersion produced by refracting materials typically varies with the radiation wavelength. Thus for example the dispersion of fused quartz is approximately 20 times higher in the violet region of the visible spectrum than in the near infrared region. This means that, if only one material is used for refractive dispersion in a spectrometer, or if the dispersing elements produce dispersion mainly or wholly in the same direction, there will generally be much higher spectral resolution in some spectral regions than in others. This can be a significant disadvantage in some instruments, since low signal levels will be produced in spectral regions where there is excess spectral resolution, because there is less radiation falling on individual detector elements in these regions. This can be alleviated by electronic processing ("binning") of the signals from the detector elements. Non-uniform spectral resolution can be reduced by electronic summing of signals from detector elements that receive radiation where the dispersion is relatively high.

This problem can in principal be solved optically by use of two or more refracting prisms or curved wedges in different materials, providing dispersion in opposite directions, as indicated in FIG. 5A. For example, in the visible spectral region, the useful component of dispersion may be produced by a curved wedge of a crown glass material, 501, having relatively low dispersive power. This element will give higher dispersion in the blue spectral region than in the red, as indicated by the exaggerated spreads of the red rays 502 and 503, and the blue rays 504 and 505. The crown element may therefore be used in combination with a flint glass element, 506. The flint will have higher dispersive power in all visible spectral regions, for a given wedge angle, but a smaller wedge angle will be used than for the crown glass. The flint glass has a higher ratio of dispersion in the blue spectral region than in the red, as indicated by the exaggerated spreads of the red rays 507 and 508, and the blue rays 509 and 510. When the two prisms are used together, deflecting the radiation in opposite directions, the flint element 506 subtracts from the dispersion provided by the crown, but it reduces the total dispersion more in the blue spectral region than in the red, as shown by the red rays 511 and 512, and the blue rays 513 and 514.

A disadvantage of this scheme is that the wedge angles required for the prisms are much larger than would be required if only one wedge were used to provide the required dispersion at any selected wavelength. For imaging spectrometers, this tends to increase aberrations, and may require that the combination of prisms is cemented in order to avoid total internal reflection of the radiation, or to reduce polarisation produced at extreme angles. Cementing is readily feasible for a range of optical glasses. However, there is a limited range of materials that can be used for wide spectral ranges, for example including either the ultra-violet or the short-wave infrared with the visible region. It is difficult to find suitable combinations of materials that have near-equal coefficients of thermal expansion, so that cemented combinations cannot be used over wide temperature ranges without risk of fracture due to differential thermal expansion.

Figure 5B:
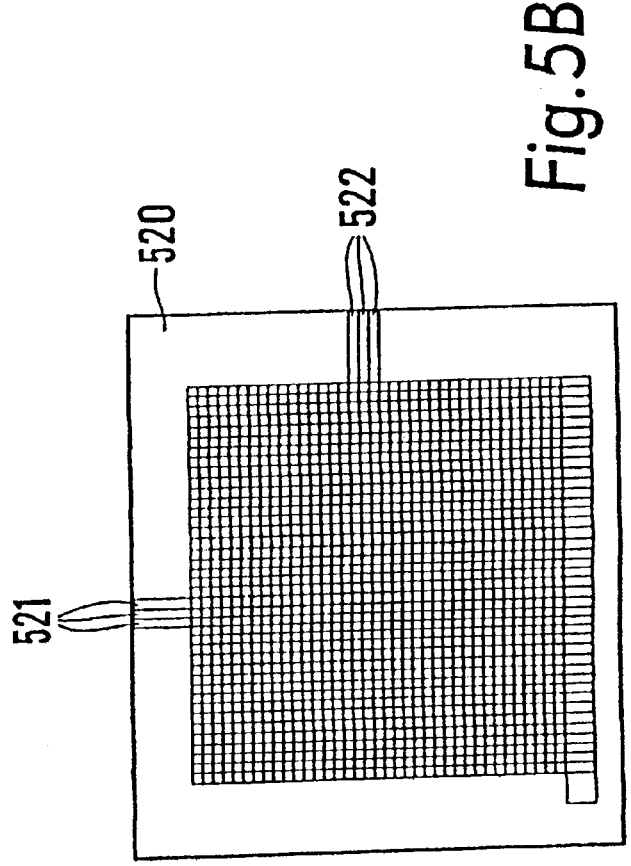

The problem of non-uniform spectral dispersion outlined above can be ameliorated by processing the signals produced using a detection system, as indicated in figure 5B. The spectrum is typically formed on a detector array 520. An area array detector is shown in figure 5B, such as would be used in an imaging spectrometer, with rows 521 of elements receiving individual wavelengths, and columns 522 of elements receiving spectral of individual spatially-resolved object points. Blue wavelengths are imaged over a group of rows 523, and red wavelengths, having a nominally equal waveband, are imaged over a much narrower group of rows 524.

In principal, the whole detector array may be read out, and the signals from each detector element recorded. Low signal levels will be associated with the rows 523 assigned to blue wavelengths. However, since excess spectral resolution is produced for blue wavelengths, it is reasonable to sum the signals in sets of rows, for the blue region particularly. This provides higher signal levels for the blue spectral region, associated with spectral resolution more nearly equivalent to that achieved (without summation of rows) in the red spectral region.

Spectrometers used for the spectral regions from near ultraviolet to near infrared may use charge coupled device (CCD) detectors. In these detectors, signal charges are generated on the individual elements. The signal charges are then rapidly shifted down columns by drive signal voltages applied to electrodes parallel with rows, so that the signals associated with each detector row arrive sequentially at an output register row 525. Signal charges in the output register 525 are then shifted along the register row by applied drive signal voltages applied to register elements, to arrive sequentially at an output pot 526, from which the signals are read out. In normal operation, every row of charges is read out individually, to provide a record of signal from every element in the array. However, it is possible to vary the sequence of drive signals applied to the CCD rows and an output register 527, such that two or more rows of signal charges are shifted into the output register between readouts from the output register When this is done, the signals associated with selected sets of rows are summed in the output register before the charges are read out.

This use of CCDs to sum signals before read-out has substantial advantages over summation of signals after read-out, since the process of summation in the CCD is virtually free of electronic noise.

Two wedges, or a double-pass through a single wedge, can usefully be employed to correct for, inter alia, astigmatism over an object and image field extended in the direction orthogonal to the dispersion direction. This correction is of significance for imaging spectrometers, since it in part depends upon the useful length of the spectrometer entrance slit.

The residual astigmatism produced by the passage of diverging rays through a curved wedge can be compensated by the residual astigmatism produced by the passage of converging rays through a curved wedge (either the same wedge or a separate one), provided that the rays are dispersed in the same sense by the two passages of rays through refracting wedge material. This allows two wedges to produce complementary effects, so that a common material may be used. Alternatively, a single wedge produces complementary effects on two passes of radiation.

The relay imaging system can be designed initially as a concentric system—either a Dyson relay or an Offner relay. An advantage is that concentric systems allow good correction within very simple designs.

The relay imaging system may comprise a concave spherical mirror and refracting element having one convex spherical surface, such that the separation of the spherical refracting surface and the concave mirror surface is approximately equal to the difference of the radii of curvature of these two surfaces. In this case one or more curved refracting wedges may be located between the refracting element and the mirror.

The relay imaging system may comprise a concave spherical mirror from which the radiation is reflected twice and a convex spherical mirror reflecting the radiation once, such that the separation of the convex mirror from the concave mirror is approximately equal to the difference of the radii of curvature of the two mirrors. In this case, curved refracting wedges may be located between the source and the first concave mirror reflecting area, and between the last concave mirror reflecting area and the image plane.

However concentric systems always work at unit magnification, unless there are different media (for example glass and air) in the spaces following the source and preceding the image plane. Unit magnification is not always convenient, so that different relay optical systems will also sometimes be considered.

In practice, optical systems will be designed by a conventional process involving initial arrangement, based on simple design theory as presented above, followed by computer optimisation, using software such as, for example, CODE V®. Such optimisation will maintain the basic structure and components of the design but may alter the relative positions of the components and the curvature of their optical surfaces. Thus, for example, what may start out as concentric optical systems may no longer be so after optimisation.

In computer optimisation, selected design variables are altered automatically through small increments, the effects of each alteration are computed, an optimum combination of small changes is then computed, to improve the image according to defined criteria, and tie process is repeated automatically until a satisfactory design is achieved. In this process, the design parameters that are allowed to vary will generally include the tilts, curvatures and separations of all or most wedge surface. In the case of a starting design based on a Dyson relay, the tilt curvature and separation of the mirror will generally be allowed to change in optimisation. Curvature, tilt and thickness of the refracting element may also be varied, and other elements, for example including a detector window, may also be allowed to change. In the case of an Offner relay starting-design, the curvatures, tilts and separations of the mirrors may be allow ed to change, and the single concave mirror may be split into two mirrors (assigned to the two sequential reflections at concave surfaces) and these two mirrors may be allowed to change independently.

Figure 8:
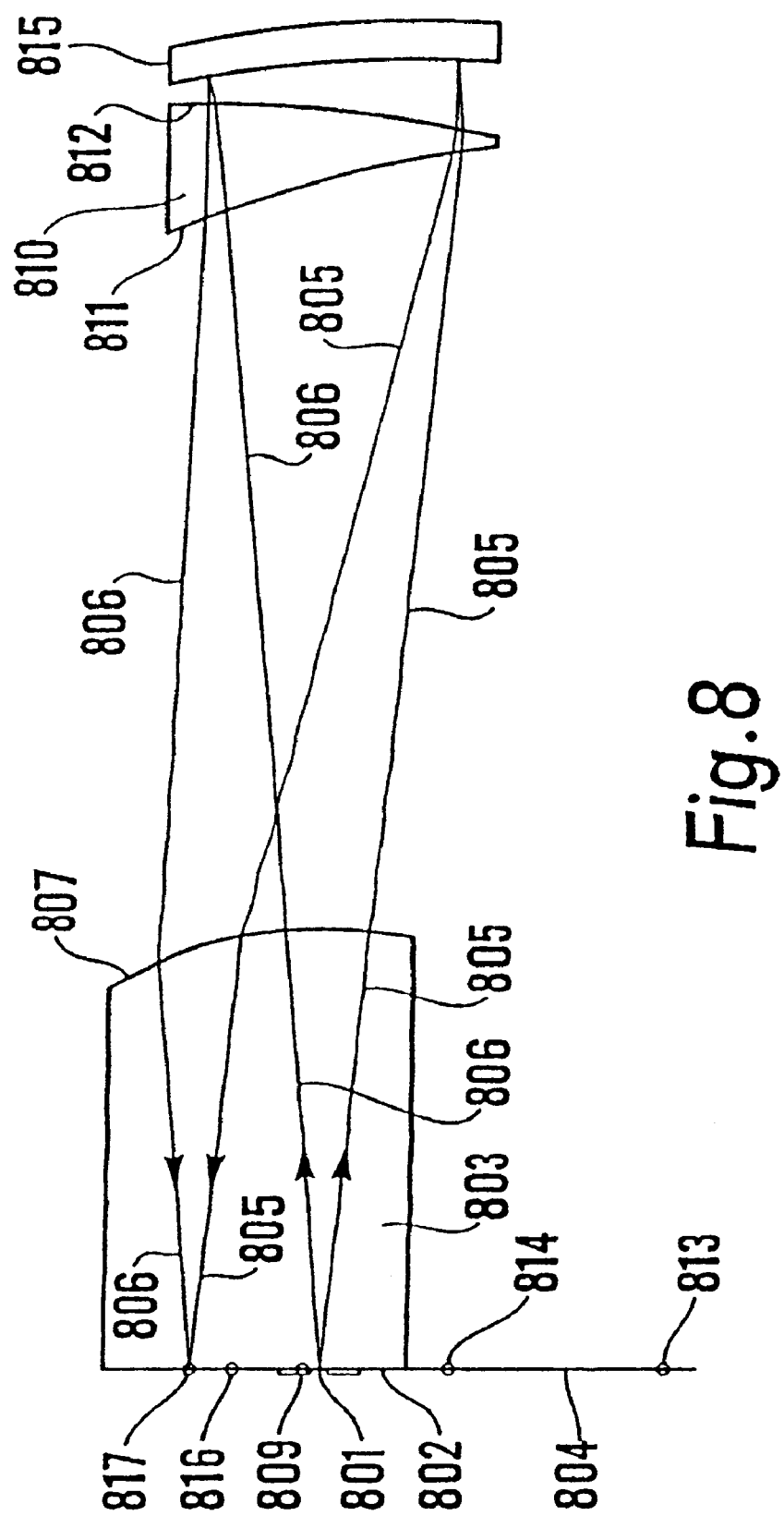
FIG. 8 shows an imaging spectrometer incorporating a Dyson relay.
Figure 9:
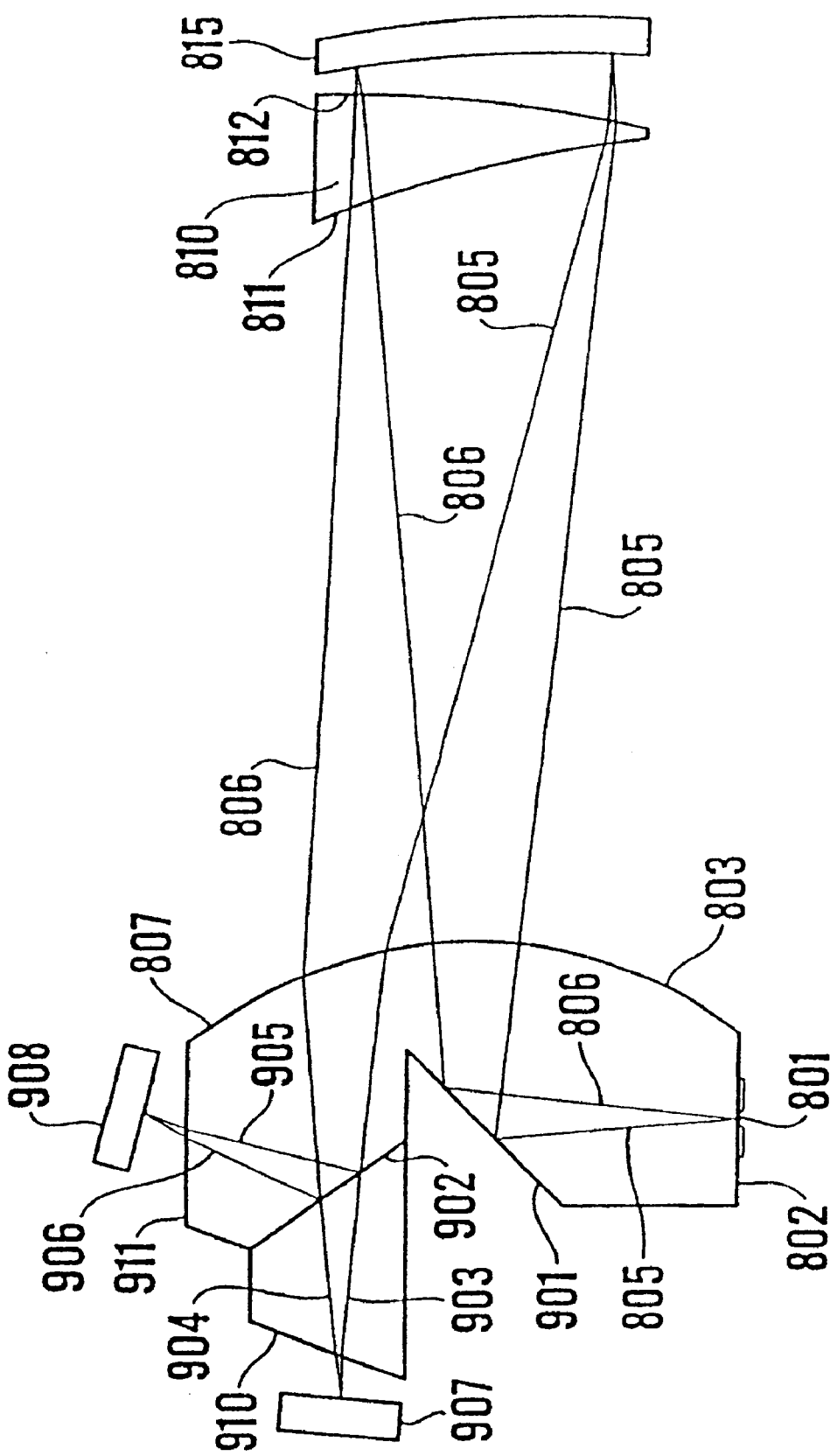
FIG. 9 shows an imaging spectrometer incorporating a Dyson relay and a dichroic beam splitter.
Figure 10:
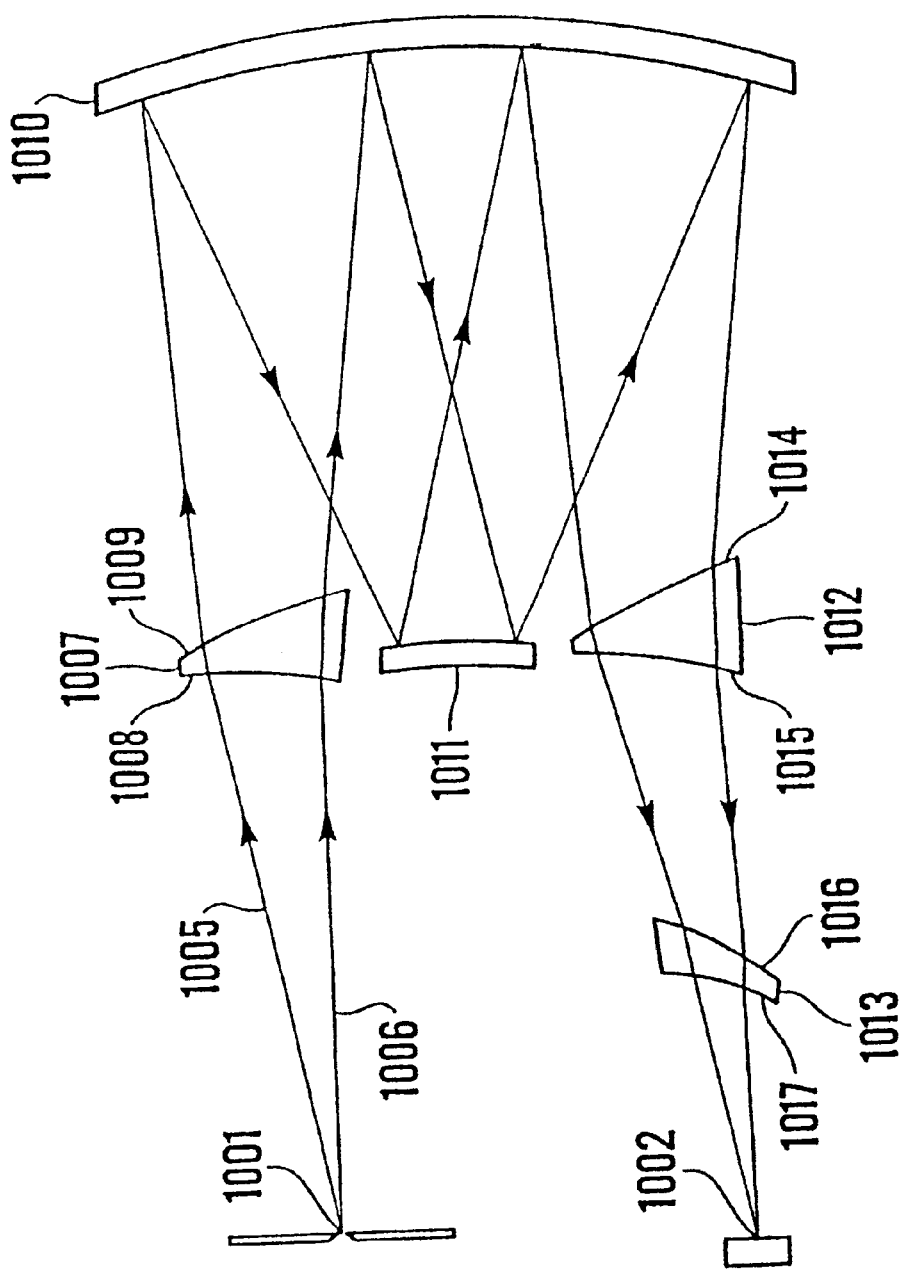
FIG. 10 shows an imaging spectrometer incorporating an Offner relay.

FIG. 8 shows an optical system in which a Dyson relay is modified to provide an imaging spectrometer by the addition of a single curved refracting wedge located near the mirror. FIG. 9 shows a further refined design of the kind shown in FIG. 8. FIG. 10 shows an optical system according to a second embodiment of the invention in which an Offner relay is modified to form an imaging spectrometer by the addition of three curved refracting wedges.

Referring to FIG. 8 the entrance slit of the spectrometer, 801 is located on the surface 802 of a refracting element 803. The surface 802 is flat, and lies in a flat plane 804. Rays diverging from a point in the entrance slit are indicated by lines 805 and 806. The rays pass through the refracting element and exit through the refracting surface 807, which is spherical and has a centre of curvature at point 809 in the plane 804. The rays next pass through the curved refracting wedge 810. The surfaces 811 and 812 of the refracting wedge 810 are both spherical and have centres of curvature at points 813 and 814 in the plane 804. After passing through the refracting wedge 810, the rays are reflected from the concave spherical mirror 815, which has a centre of curvature at the point 816 in the plane 804. After reflection at the mirror 815, the rays are again transmitted through the refracting wedge 810, through the spherical surfaces 812 and 811, and into the refracting element 803 through the spherical surface 807. The rays focus on the flat surface 802 of the element 803, at the point 817.

The configuration as described has rotational symmetry about the line joining the object point 801, the image point 817 and the centres of curvature 809, 813, 814 and 816 of all the spherical surfaces. This means that all rays leaving a point in the line are imaged by the system through the same line. There is therefore no spherical aberration or coma in the image formed in the plane 804. Astigmatism is corrected by adjusting the relative positions of the centres of curvature of the spherical surfaces along the line. In final optimisation of the optical design, the radii of curvature and separations of the optical surfaces may also be allowed to vary, in order to optimise correction for higher order aberrations, so that the centres of curvature may no longer lie on a common line through the object and image points.

FIG. 9 shows a refinement of the design shown in FIG. 8, in which two separate detector arrays and detector windows are included. In FIGS. 8 and 9, like numerals indicate like features, including the entrance slit 801, the refracting element 803, with flat surface 802 and spherical surface 807, the curved refracting wedge 810, with spherical surfaces 811 and 812, and the concave spherical mirror 815. Rays diverging from the entrance slit 801 are again indicated by the lines 805 and 806. In the design shown in FIG. 9, the rays 805 and 806 pass as before out of the refracting element 803 through surface 807, through the curved refracting wedge 810. They are reflected as before from the spherical mirror 815 and return through the refracting wedge 810 and into the refracting element 803 through spherical surface 807.

However, in FIG. 9, the refracting element 803 is modified to include an internally reflecting surface 901, and a dichroic cemented interface 902. The path of rays between the entrance slit 801 and the first transmission through the spherical refracting face 807 is folded for convenience at the flat reflecting face 901. The beam returning through the refracting element, represented by the rays 805 and 806, is split into two components at the dichroic cemented interface 902. The two beam components are represented by the lines 903 and 904 in the transmitted beam, and by the lines 905 and 906 in the reflected beam. In FIG. 9, convenient locations for two detectors 907 and 908 are shown, clear of the refracting element 803. The two beams leave the refracting element 803 at flat surfaces 910 and 911.

In an imaging spectrometer covering a wide spectral waveband, it is often necessary to use two detectors, as indicated for example in FIG. 9. In this example, the detector 907 could be a silicon detector array, covering the spectral range from near ultra-violet to 1 microns wavelength, and the detector 908 could be a cadmium-mercury-telluride detector array, covering the spectral waveband from 1 micron to 2.5 microns. In this case, the cemented dichroic coating 902 will be designed to reflect wavelengths longer than 1 micron, and to transmit wavelengths shorter than one micron. A problem in design of imaging spectrometers is control of stray light due to multiple reflections between the detector surface and near-by optical surfaces. The flat surfaces 910 and 911, at which the beams leave the refracting element 803, are therefore shown at oblique angles with respect to the transmitted rays. Tilts of the surfaces can be controlled to prevent stray reflections from reaching the detectors.

In optimisation of a design as indicated in FIG. 9, the tilts of flat surfaces 910 and 911, the tilts of the spherical surfaces 807, 811 and 812, the tilt of the mirror 815 and the tilts of the detectors 907 and 908, are all allowed to vary, with the curvatures of the spherical surfaces and separations of surfaces. In practice this allows the aberrations introduced by tilting the flat surfaces (essentially to control stray light) to be compensated by aberrations of remainder of the optical system. If the detectors are provided with windows, the window surfaces may also be tilted to control stray light.

FIG. 10 shows a further imaging spectrometer according to a second embodiment of the invention. Rays, indicated by lines 1005 and 1006, diverge from the entrance slit 1001. The rays pass through a curved refracting wedge 1007 having spherical surfaces 1008, 1009. The rays are then reflected from a concave spherical mirror 1010, then from a convex spherical mirror 1011, and then again from the concave spherical mirror 1010. The rays then pass through two curved refracting wedges 1012 and 1013, having spherical surfaces 1014, 1015, 1016 and 1017. Finally, the rays focus on a detector 1002, for example like detector array 520 illustrated in FIG. 5.

In the design shown in FIG. 10, two of the curved wedges, elements 1007 and 1012, provide deflection and dispersion of the beam in the same direction. The third curved refracting wedge, 1013, provides deflection of the beam in the opposite direction and therefore has the effect of reducing the overall dispersion produced by the wedge system. However, it is useful in permitting additional control of aberrations of the system in final optimisation since being close to the detector 1002, it has a relatively large effect on distortion of the final image. This allows the wedge to be used to correct the straightness of the images that are formed in the detector plane at each wavelength, given a straight entrance slit. Such correction is often convenient; however it is not always essential, since curvature of the slit images can also be controlled by curving the entrance slit or by processing the data read-out from a detector array.

FIG. 10 indicates an optimised design, in which curvatures and tilts of all optical surfaces, and separations of surfaces, have been allowed to vary, in order to produce a well-resolved image with minimal distortion. In a starting-design, before optimisation, all centres of curvature of spherical surfaces may reasonably be located on a common line joining the entrance slit centre 1001 and the detector 1002. In the final design, the centres of curvature of the spherical surfaces are more widely distributed.

Figure 11:
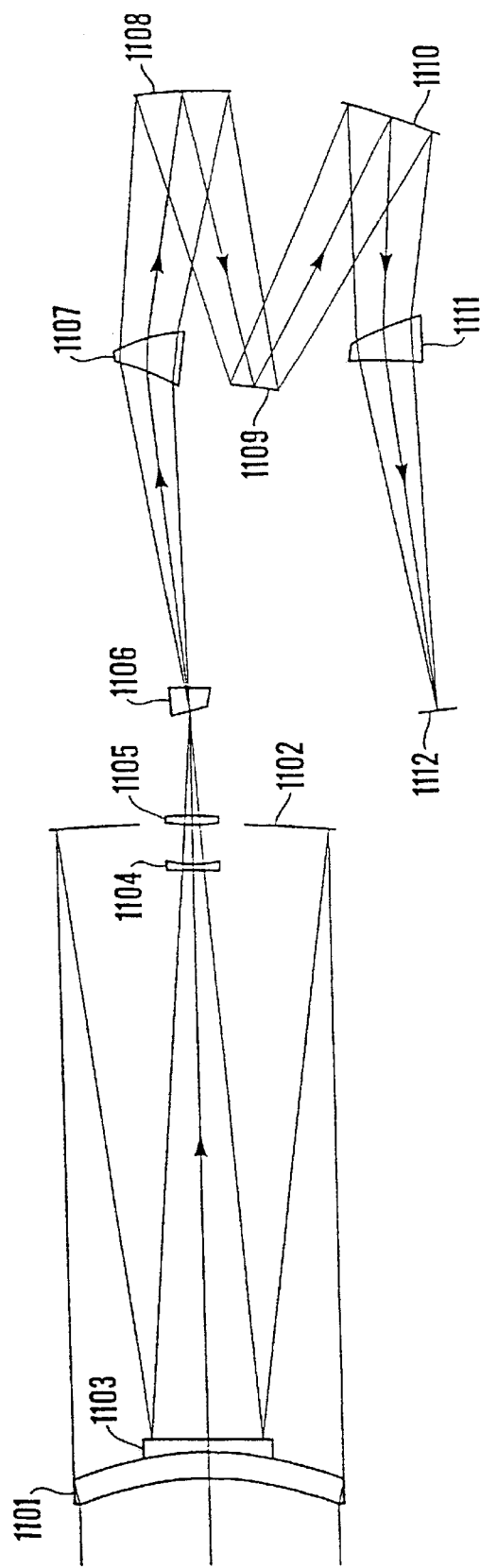
FIG. 11 shows an imaging spectrometer for an Earth-orbiting satellite.
Figure 12:
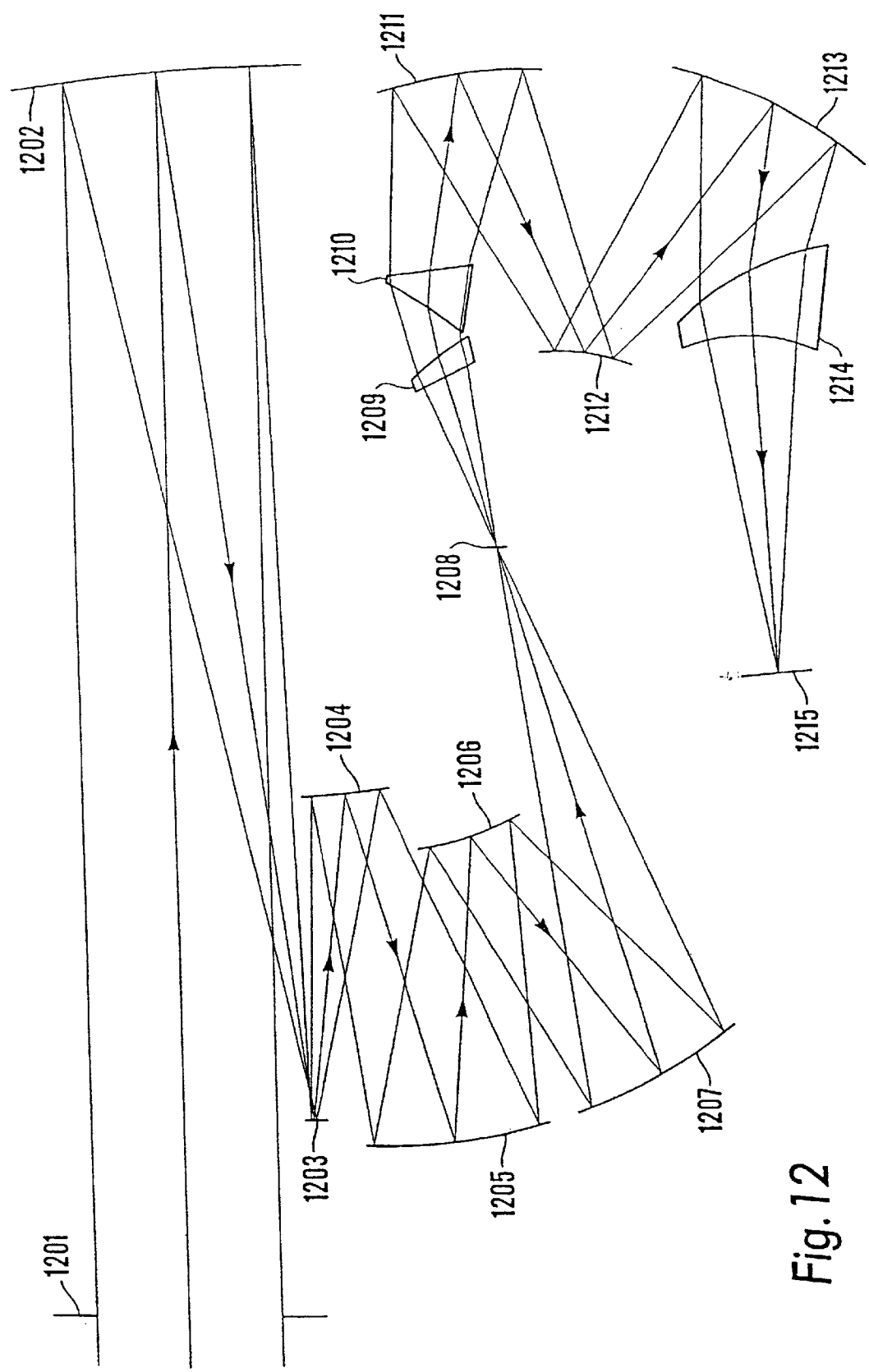
FIG. 12 shows another imaging spectrometer for an Earth-orbiting satellite.
Figure 13:
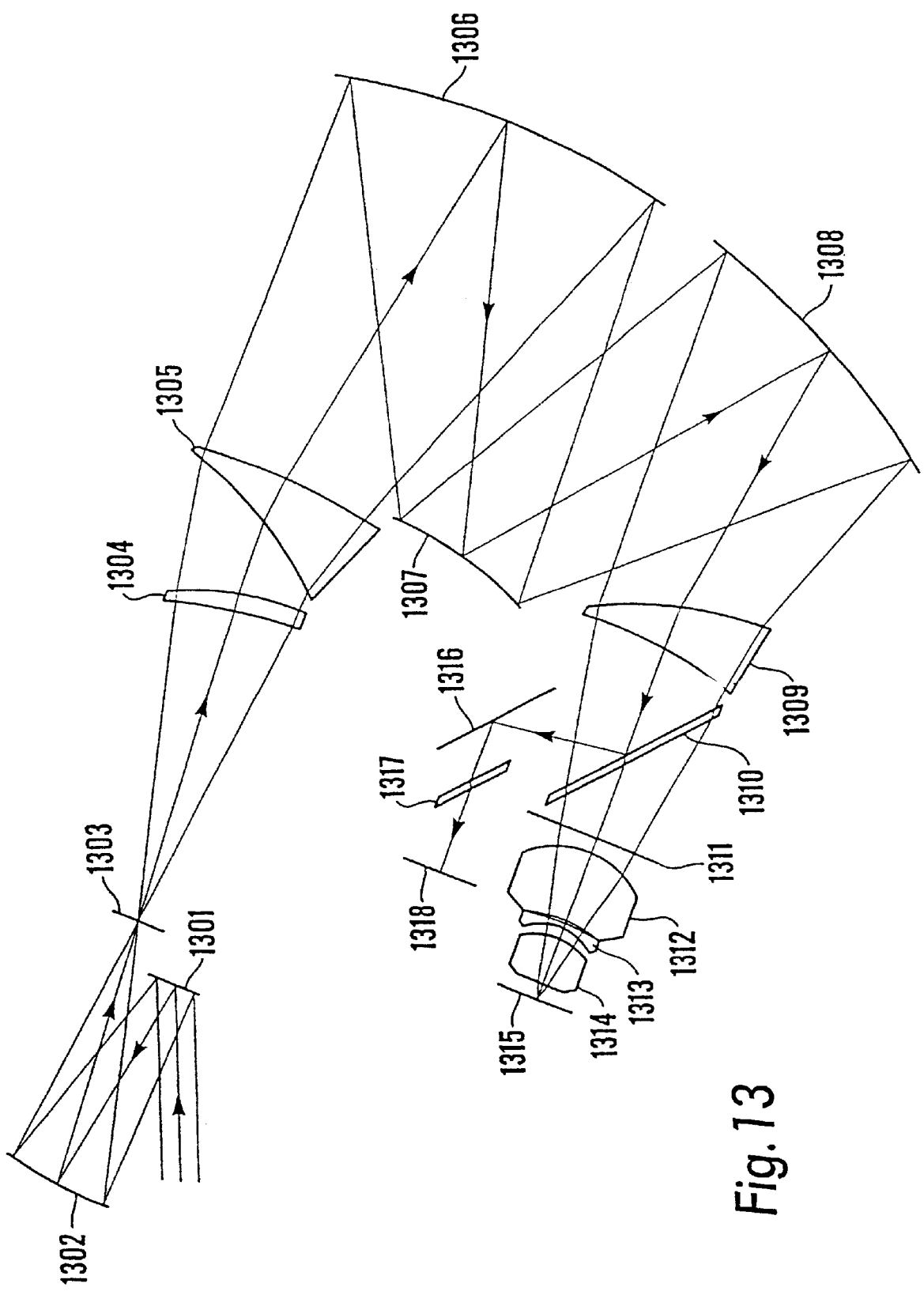
FIG. 13 shows an imaging spectrometer for Earth observation from an aircraft.

FIGS. 11, 12 and 13 show detailed optical designs for complete imaging spectrometers including, in each of these designs, the imaging optics that form an image of the scene of interest onto the spectrometer entrance slit.

Optical design data for the systems shown in FIGS. 11, 12 and 13 are given in Tables 1, 2 and 3 respectively. The tables include surface radii of curvature, surface separations and materials of lenses and prisms. In each case, separations of surfaces are measured in the direction of the beam arriving at the spectrometer entrance slit. Decentrations of surfaces, also given in the tables, are in each case in the plane of the diagram, at right angles to the axis of the incident beam. Tilts of surfaces given in each table are rotations on axes orthogonal to the plane of the associated diagram. Notes in the tables give surface types. Where no note is included, the surface is simply refracting. All surfaces are either flat (plane) or spherical; reference numerals of the relevant optical elements are shown in parentheses. Table 3 includes a "new axis surface", which means that the separations, decentrations and tilts of following surfaces are with respect to the axis through the defined centre of this surface.

FIG. 11 shows the optical system for an imaging spectrometer designed to be mounted on an Earth-orbiting satellite. It includes an imaging system of long focal length designed to image Earth at a spatial resolution of 25 nm, in a swathe width of 19 km, from a satellite altitude of approximately 800 km. The imaging system, comprising lens elements 1101, 1104 and 1105 and mirrors 1102 and 1103, forms an image of the distant scene onto the entrance slit. The entrance slit is located on the first surface of a refracting wedge 1106. The width of the entrance slit and the detector element size are nominally 22.5 microns. The spectrometer provides spectral resolution better than 12 nm over the wavelength range 400 nm to 1050 nm. The beam diverging from the entrance slit is refocused by a system of three mirrors, 1108, 1109 and 1110, onto the area-array detector 1112. In the paths between the entrance slit and the first spectrometer mirror 1108, the beam is dispersed by the curved prism 1107, and the beam is also dispersed by the curved prism 1111 in the path between the third spectrometer mirror and the image plane. The optical system works at a low relatively aperture—approximately f/6—so that good resolution and good control of image distortions are achieved using only two prisms as shown.

FIG. 12 shows the optical system for another imagine spectrometer designed to be used on an Eardi-orbiting satellite, for observation of Earth surface. The imaging system in this case is designed to provide spatial resolution of 50 m from an altitude in the region of 700 km, in a swath width of 50 km. The imaging system is a modified Shaffer telescope, with five spherical mirrors, 1202, 1204, 1205, 1206 and 1207, and one flat folding mirror, 1203. The entrance pupil is indicated by the numeral 1201. The telescope forms an image of the distant scene onto the spectrometer entrance slit 1208. The width of the entrance slit and the detector element size are nominally 24 microns. The spectrometer in this design provides spectral resolution better than 11 nm over a nominal spectral range from 450 nm to 2350 nm. The beam diverging from the entrance slit is refocused onto the image surface 1215 by three spherical mirrors 1211, 1212 and 1213. In the path between the entrance slit and the first of these mirrors, the beam is dispersed by the prisms 1209 and 1210. The beam is also dispersed by the prism 1214 in the path between the last mirror and the image surface.

In this design, the path between the last prism 1214 and the image surface is increased in optimisation, in comparison with the path between the entrance slit and the first prisms, 1209 and 1210. This long path is useful for accommodation of a dichroic beam-splitter between the last prism and the image surface, which will split the beam between two area-array detectors. The long path is also useful for accommodation of a cryostat in which one of the two detectors will be mounted. However, the diagram does not show the dichroic split or two separate detector planes. Most of the dispersion is provided by the prisms 1210 and 1214—the prism 1209 provides some additional dispersion, but is included mainly to improve resolution and control of image distortions. The system works at a relative aperture of f/3.5.

FIG. 13 shows the optical system for an imaging spectrometer designed to be flown on aircraft, again for observation of Earth. In this case, the system will typically be used to provide spatial resolution of 3.75 m from an altitude of 7.5 km, in a swath width of 3.75 km. The imaging system in this case has a focal length of 56 mm and an aperture diameter of 20 mm. This is achieved using a Schwarschild two-mirror design. The convex primary mirror 1301 and the concave secondary mirror 1302 are both oblate spheroids. Conic constants for these mirrors are respectively 5.8109 and 0.18032. The two-mirror system forms an image on the entrance slit 1303 of the spectrometer. The entrance slit has a nominal width of 28 microns. The spectrometer in this design provides spectral resolution better than 12 nm over a nominal spectral range from 450 nm to 2500 nm.

The entrance slit, 1303 in FIG. 13, is refocused by the three mirrors 1306, 1307 and 1308, to form images on area-array detectors 1315 and 1318. The beam is dispersed by prisms 1304 and 1305 in the path between the entrance slit and the first spectrometer mirror, and also dispersed by the prism 1309 in the path following the last spectrometer mirror. The design works at high relative aperture—f/2.8 at the entrance slit and at the image surface 1318. This high relative aperture requires 3 curved prisms, to achieve good resolution and good control of image distortions in a compact design. The beam is split by a dichroic semi-reflecting mirror, 1310, following the last dispersing prism 1309, to form images on two detectors, 1315 and 1318. The detector element sizes are nominally 18.5 microns for detector 1315 and 28 microns for detector 1318. The detector 1315 receives the spectral waveband from 950 nm to 2500 nm, while the detector 1318 receives the spectral waveband from 450 nm to 1000 nm. The beam transmitted through the dichroic 1310 passes through a lens to the detector 1315. The lens, which comprises three elements 1312, 1313 and 1314, has the function of reducing the size of the image formed on detector 1315 by a factor 0.66. The beam reflected from the dichroic 1310 is reflected at a fold mirror 1316, and passes through a corrector plate 1317 to the detector 1318.

Many other effective alternative configurations will occur to those skilled in the art and it should be understood that the present invention is not limited to the illustrated embodiments.

TABLE 1

| Surface No | Radius (mm) | Separation (mm) | Material | Tilt (degrees) | Decentration (mm) | Notes |
|---|---|---|---|---|---|---|
| 1 | −156.58 | | | | | Pupil (1101) |
| | | 10.94 | Silica | | | |
| 2 | −161.66 | | | | | |
| | | 266.52 | Air | | | |
| 3 | −890.93 | | | | | Mirror (1102) |
| | | −261.52 | Air | | | |
| 4 | −1064.60 | | | | | Mirror (1103) |
| | | 242.42 | Air | | | |
| 5 | Plane | | | | | |
| | | 2.00 | Silica | | | (1104) |
| 6 | 50.06 | | | | | |
| | | 16.84 | Air | | | |
| 7 | 73.29 | | | | | |
| | | 4.00 | Silica | | | (1105) |
| 8 | −156.58 | | | | | |
| | | 43.72 | Air | | | |
| 9 | Plane | | | 15.00 | | Entrance slit |
| | | 9.85 | Silica | | | (1106) |
| 10 | Plane | | | | | |
| | | 135.56 | Air | | | |
| 11 | −97.99 | | | −18.44 | 18.80 | |
| | | 13.70 | Silica | | | (1107) |
| 12 | −104.73 | | | 14.83 | 17.10 | |
| | | 105.00 | Air | | | |
| 13 | −262.82 | | | 2.18 | −0.70 | Mirror (1108) |
| | | −125.67 | Air | | | |
| 14 | −134.44 | | | −7.62 | −31.80 | Mirror (1109) |
| | | 114.63 | Air | | | |
| 15 | −262.82 | | | −16.20 | −95.80 | Mirror (1110) |
| | | −89.92 | Air | | | |
| 16 | −283.50 | | | 21.65 | −91.10 | |
| | | −13.58 | Silica | | | (1111) |
| 17 | −268.69 | | | −1.34 | −91.20 | |
| | | −150.00 | Air | | | |
| 18 | Plane | | | 6.00 | −112.54 | Image (1112) |

TABLE 2

| Surface No | Radius (mm) | Separation (mm) | Material | Tilt (degrees) | Decentration (mm) | Notes |
|---|---|---|---|---|---|---|
| 1 | Plane | | | | | Pupil (1201) |
| | | 570.00 | Air | | | |
| 2 | −938.19 | | | | | Mirror (1202) |
| | | −480.00 | Air | | | |
| 3 | Plane | | | | | Mirror (1203) |
| | | 146.31 | Air | | | |
| 4 | 657.11 | | | 2.98 | | Mirror (1204) |
| | | −159.27 | Air | | | |
| 5 | 275.00 | | | | −40.00 | Mirror (1205) |
| | | 134.28 | Air | | | |
| 6 | 152.40 | | | 1.35 | −40.00 | Mirror (1206) |
| | | −134.28 | Air | | | |
| 7 | 279.48 | | | 0.16 | −40.00 | Mirror (1207) |
| | | 272.97 | Air | | | |
| 8 | Plane | | | | −97.47 | Entrance slit (1208) |
| | | 72.86 | Air | | | |
| 9 | 13504.10 | | | 24.59 | −64.00 | |
| | | 7.33 | Silica | | | (1209) |
| 10 | −125.83 | | | 40.65 | −63.00 | |
| | | 36.19 | Air | | | |
| 11 | −226.47 | | | −30.79 | −56.00 | |
| | | 8.64 | Silica | | | (1210) |
| 12 | −8809.02 | | | 6.70 | −56.00 | |
| | | 90.00 | Air | | | |
| 13 | −240.00 | | | 8.00 | −80.00 | Mirror (1211) |
| | | −127.00 | Air | | | |

TABLE 2-continued

| Surface No | Radius (mm) | Separation (mm) | Material | Tilt (degrees) | Decentration (mm) | Notes |
|---|---|---|---|---|---|---|
| 14 | −97.03 | | | −5.12 | −137.00 | Mirror (1212) |
| | | 114.60 | Air | | | |
| 15 | −240.00 | | | −23.73 | −230.00 | Mirror (1213) |
| | | −90.00 | Air | | | |
| 16 | −149.70 | | | 34.09 | −202.00 | |
| | | −20.00 | Silica | | | (1214) |
| 17 | −103.63 | | | 9.24 | −203.00 | |
| | | −152.63 | Air | | | |
| 18 | Plane | | | 3.80 | −224.01 | Image (1215) |

TABLE 3

| Surface No | Radius (mm) | Separation (mm) | Material | Tilt (degrees) | Decentration (mm) | Notes |
|---|---|---|---|---|---|---|
| 1 | Plane | | | | | Virtual pupil |
| | | −22.28 | Air | | | |
| 2 | 162.76 | | | | | Aspheric mirror (1301) |
| | | −112.55 | Air | | | |
| 3 | 160.20 | | | | | Aspheric mirror (1302) |
| | | 136.42 | Air | | | |
| 4 | Plane | | | | 19.59 | Entrance slit (1303) |
| | | 160.21 | Air | | | |
| 5 | −258.60 | | | | −16.17 | (1304) |
| | | 9.04 | Silica | | | |
| 6 | −154.07 | | | | −9.99 | |
| | | 65.70 | Air | | | |
| 7 | −212.92 | | | | 129.17 | (1305) |
| | | −7.24 | Silica | | | |
| 8 | −357.38 | | | | 34.50 | |
| | | 200.00 | Air | | | |
| 9 | −400.00 | | | | −30.24 | Mirror (1306) |
| | | −199.60 | Air | | | |
| 10 | −185.01 | | | | −35.03 | Mirror (1307) |
| | | 197.41 | Air | | | |
| 11 | −400.00 | | | | −41.23 | Mirror (1308) |
| | | −185.00 | Air | | | |
| 12 | −241.30 | | | | −249.81 | (1309) |
| | | −25.00 | Silica | | | |
| 13 | −220.66 | | | | −160.83 | |
| | | −65.00 | Air | | | |
| 14 | Plane | | | 45.00 | −185.00 | Dichroic (1310) |
| | | −5.00 | Silica | | | |
| 15 | Plane | | | 45.00 | −185.00 | |
| | | −30.00 | Air | | | |
| 16 | Plane | | | −2.75 | −187.50 | New axis surface (1311) |
| | | 0.00 | Air | | | |
| 17 | Plane | | | | | |
| | | −8.50 | Air | | | |
| 18 | −44.00 | | | | | |
| | | −34.46 | Fluorite | | | (1312) |
| 19 | −69.42 | | | | | |
| | | −1.25 | Air | | | |
| 20 | −84.94 | | | | | |
| | | −2.40 | Schott LF8 | | | (1313) |
| 21 | −26.59 | | | | | |
| | | −5.42 | Air | | | |
| 22 | −31.27 | | | | | |
| | | −23.49 | Fluorite | | | (1314) |
| 23 | −147.78 | | | | | |
| | | −8.86 | Air | | | |
| 24 | Plane | | | −0.28 | −0.68 | Image 1 (1315) |
| Alternate Path | | | | | | |
| 14 | Plane | | | 45.00 | −185.00 | Dichroic |
| | | 10.00 | Air | | | |
| 15a | Plane | | | 45.00 | −130.00 | Mirror (1316) |
| | | −30.00 | Air | | | |
| 16a | Plane | | | 45.00 | −130.00 | |
| | | −5.00 | Silica | | | (1317) |
| 17a | Plane | | | 45.00 | −130.00 | |
| | | −49.83 | Air | | | |
| 18a | Plane | | | −3.29 | −121.47 | Image 2 (1318) |

What is claimed is:

1. An imaging spectrometer to form a spectrally resolved image of an object slit, light traveling from the object slit to the image along an optical path, the spectrometer comprising:

first, second and third curved reflecting surfaces; and
   at least two dispersing elements, each with at least one curved surface, the spectrometer being configured such that the optical path leads:
      from the object slit, through the curved surface of one of the dispersing elements to the first curved reflecting surface;
      from the first curved reflecting surface to the second curved reflecting surface;
      from the second curved reflecting surface to the third curved reflecting surface; and
      from the third curved reflecting surface, through the curved surface of another of the dispersing elements, to the image.

2. A spectrometer as claimed in claim 1 wherein the majority of the spectrometer's dispersive power is provided by dispersing elements in the optical paths between the object slit and the first curved reflecting surface and between the image and the third curved reflecting surface.

3. A spectrometer as claimed in claim 1 wherein the dispersing elements are prisms, each with curved reflecting surfaces in the optical path.

4. A spectrometer as claimed in claim 1 wherein the curved reflecting surfaces comprise a convex and a concave mirror surface.

5. A spectrometer as claimed in claim 1 wherein the first and third curved reflecting surfaces comprise a single physical surface.

6. A spectrometer as claimed in claim 1 further comprising an optical element in the optical path between the image and the third curved reflecting surface to control image aberrations.

7. A spectrometer as claimed in claim 1 further comprising an optical element in the optical path between the object slit and the first curved reflecting surface to control optical aberrations.

8. A spectrometer as claimed in claim 1 wherein the curved surfaces of the dispersing elements are substantially spherical.

9. A spectrometer as claimed in claim 1 wherein the first, second and third curved reflecting surfaces are substantially spherical.

10. A spectrometer as claimed in claim 1 wherein, over a range of wavelengths between 200 nm and 3500 nm, the dispersing elements have dispersion mainly in the same direction.

11. An imaging spectrometer to form a spectrally resolved image of an object slit, light travelling from the object slit to the image along an optical path, the spectrometer comprising:

a curved reflecting surface;

a dispersing element with a curved surface; and first and second curved refracting surfaces, wherein the first and second curved refracting surfaces comprise a single physical curved refracting surface, the spectrometer being configured such that the optical path leads:

from the object slit, through the first curved refracting surface and through the curved surface of the dispersing element to the curved reflecting surface; and from the curved reflecting face, through the curved surface of the dispersing element and through the second curved refracting surface to the image.

12. A spectrometer as claimed in claim 11 wherein the curved reflecting surface and the curved refracting surface are substantially spherical.

13. A spectrometer as claimed in claim 11 wherein the single physical surface is a surface of a refracting element another surface of which is planar and has the object located on it.

14. A spectrometer as claimed in claim 11 wherein the dispersive power of the spectrometer varies with wavelength, the image having regions of relatively higher and lower spectral resolution;

the spectrometer further comprising:

an electronic detector with a plurality of detecting elements providing output signals, located at the image position and to detect the image; and summing means to sum the output signals from at least two detecting elements located in a region of relative higher spectral resolution.

\* \* \* \* \*